(12) United States Patent
Faucett et al.

(10) Patent No.: US 9,122,662 B2
(45) Date of Patent: Sep. 1, 2015

(54) PROCESSOR SAFETY TEST CONTROL SYSTEMS AND METHODS

(76) Inventors: James Mason Faucett, Novi, MI (US); Mark H. Costin, Bloomfield Township, MI (US); David Dean Tarby, Chelsea, MI (US); Aubrey Walter Downs, Jr., Brighton, MI (US)

( * ) Notice: Subject to any disclaimer, the term of this patent is extended or adjusted under 35 U.S.C. 154(b) by 588 days.

(21) Appl. No.: 13/150,646

(22) Filed: Jun. 1, 2011

(65) Prior Publication Data
US 2012/0310467 A1 Dec. 6, 2012

(51) Int. Cl.
*G01M 17/00* (2006.01)
*G06F 11/22* (2006.01)
*G07C 5/08* (2006.01)

(52) U.S. Cl.
CPC .......... *G06F 11/2242* (2013.01); *G07C 5/0808* (2013.01); *G01M 17/00* (2013.01)

(58) Field of Classification Search
CPC ... G06F 11/2242; G07M 17/00; G07C 5/0808
USPC ........... 701/29.1, 29.2, 29.7–29.9, 30.5, 31.7, 701/34.3
See application file for complete search history.

(56) References Cited

U.S. PATENT DOCUMENTS

| | | | |
|---|---|---|---|
| 4,234,921 A | 11/1980 | Kinoshita et al. | |
| 5,333,268 A | 7/1994 | Douglas et al. | |
| 5,345,155 A | 9/1994 | Masaki et al. | |
| 5,436,837 A | 7/1995 | Gerstung et al. | |
| 5,453,930 A | 9/1995 | Imaseki et al. | |
| 5,457,364 A | 10/1995 | Bilotti et al. | |
| 5,680,550 A | 10/1997 | Kuszmaul et al. | |
| 5,739,664 A | 4/1998 | Deng et al. | |
| 5,977,740 A | 11/1999 | McCann | |
| 6,018,694 A | 1/2000 | Egami et al. | |
| 6,067,586 A | 5/2000 | Ziegler et al. | |
| 6,088,639 A | 7/2000 | Fayyad et al. | |
| 6,271,637 B1 | 8/2001 | Kushion | |
| 6,490,511 B1 | 12/2002 | Raftari et al. | |
| 6,750,626 B2 | 6/2004 | Leonardi et al. | |
| 6,914,408 B2 | 7/2005 | Sawada et al. | |

(Continued)

FOREIGN PATENT DOCUMENTS

JP   2007166821 A   6/2007

OTHER PUBLICATIONS

U.S. Appl. No. 12/240,145, filed Sep. 29, 2008, Stephen T. West et al.

(Continued)

*Primary Examiner* — Redhwan K Mawari
*Assistant Examiner* — Rodney P King

(57) ABSTRACT

First, second, and third processor modules selectively execute a test having N test states while an ignition system of the vehicle is off. N is an integer greater than one. The N test states each include: the first processor module setting a first output to a first predetermined value for one of the N test states; the second processor module setting a second output to a second predetermined value for the one of the N test states; the third processor module setting a third output to a third predetermined value for the one of the N test states; a predetermined expectation for the one of the N test states; and at least one of the first, second, and third processor modules indicating a fault when a fourth output is different than the predetermined expectation. A control module sets the fourth output based on the first, second, and third outputs.

20 Claims, 9 Drawing Sheets

(56) References Cited

U.S. PATENT DOCUMENTS

| | | |
|---|---|---|
| 6,952,795 B2 | 10/2005 | O'Gorman et al. |
| 6,976,388 B2 | 12/2005 | Heap et al. |
| 6,984,954 B2 | 1/2006 | Leonardi et al. |
| 7,071,642 B2 | 7/2006 | Wilton et al. |
| 7,107,488 B2 | 9/2006 | Hashimoto et al. |
| 7,143,314 B2 | 11/2006 | Costin |
| 7,259,530 B2 | 8/2007 | Ochiai et al. |
| 7,471,792 B2 | 12/2008 | Yamamichi et al. |
| 7,545,111 B2 | 6/2009 | Fu et al. |
| 7,664,581 B2 | 2/2010 | Wackerl et al. |
| 7,755,310 B2 | 7/2010 | West et al. |
| 8,013,554 B2 | 9/2011 | West et al. |
| 8,099,179 B2 | 1/2012 | Naik et al. |
| 8,195,370 B2 | 6/2012 | Simon, Jr. et al. |
| 8,386,101 B2 | 2/2013 | West et al. |
| 2006/0036911 A1 | 2/2006 | Costin et al. |
| 2006/0074500 A1 | 4/2006 | Naik et al. |
| 2007/0016340 A1 | 1/2007 | Soudier et al. |
| 2007/0162806 A1 | 7/2007 | Matsumoto et al. |
| 2008/0028012 A1 | 1/2008 | Kato et al. |
| 2008/0059016 A1 | 3/2008 | Mayhew et al. |
| 2008/0177453 A1 | 7/2008 | Costin et al. |
| 2008/0224478 A1 | 9/2008 | Tamor |
| 2009/0071147 A1* | 3/2009 | Wang et al. ............. 60/547.1 |
| 2009/0112392 A1 | 4/2009 | Burr et al. |
| 2010/0114424 A1* | 5/2010 | Morris et al. ............... 701/31 |
| 2010/0138107 A1* | 6/2010 | Morris et al. ............... 701/36 |
| 2010/0218012 A1 | 8/2010 | Joseph et al. |
| 2011/0010032 A1 | 1/2011 | Kozarekar et al. |

OTHER PUBLICATIONS

U.S. Appl. No. 12/240,259, filed Sep. 29, 2008, Stephen T. West et al.
U.S. Appl. No. 12/240,378, filed Sep. 29, 2008, Stephen T. West et al.
U.S. Appl. No. 13/052,506, filed Mar. 21, 2011, Aubrey Walter Downs Jr. et al.
Grewe, Tim M. et al., "Defining the General Motors 2-Mode Hybrid Transmission," SAE Technical Papers Series, 2001-01-0273, 2007 World Congress, Apr. 16-19, 2007, 12 pages.
U.S. Appl. No. 12/240,259, filed Sep. 29, 2008, West et al.
U.S. Appl. No. 13/052,506, filed Mar. 21, 2011, Downs Jr. et al.

* cited by examiner

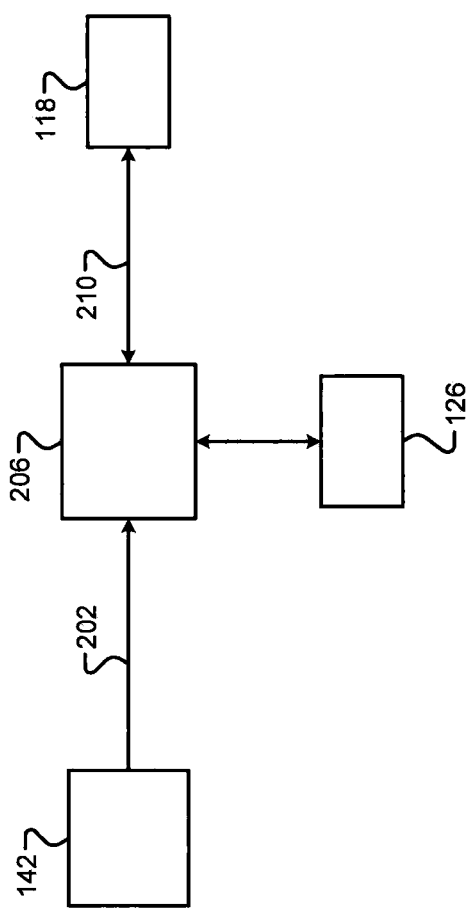

PROCESSOR SAFETY TEST CONTROL SYSTEMS AND METHODS

FIELD

The present disclosure relates to vehicles and more particularly to processor safety testing systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, an electric hybrid vehicle 10 is shown. The electric hybrid vehicle 10 includes an engine assembly 12, a hybrid power assembly 14, a transmission 16, a drive axle 18, and a control module 20. The engine assembly 12 includes an internal combustion engine 22 that is in communication with an intake system 24, a fuel system 26, and an ignition system 28.

The intake system 24 may include an intake manifold 30, a throttle 32, and an electronic throttle control (ETC) 34. The ETC 34 controls the throttle 32 to control airflow into the engine 22. The fuel system 26 includes fuel injectors (not shown) to control a fuel flow into the engine 22. The ignition system 28 ignites an air/fuel mixture provided to the engine 22 by the intake system 24 and the fuel system 26.

The engine 22 may or may not be coupled to the transmission 16 via a coupling device 44. The coupling device 44 may include one or more clutches and/or a torque converter. The engine 22 generates mechanical power. The transmission 16 transfers power from the engine 22 and/or the hybrid power assembly 14 to an output shaft 46, which rotatably drives the drive axle 18.

The hybrid power assembly 14 includes one or more motor generator units. For example only, as shown in FIG. 1, the hybrid power assembly 14 includes two motor generator units: a first motor generator unit (MGU) 38 and a second MGU 40. The hybrid power assembly 14 also includes a power control module 41 and a rechargeable battery 42.

The first and second MGUs 38 and 40 operate independently and at any given time may each operate as either a motor or a generator. An MGU operating as a motor converts electrical power into mechanical power (e.g., torque), all or a portion of which may be used to drive the output shaft 46. An MGU operating as a generator converts mechanical power into electrical power.

For example only, the first MGU 38 may generate electrical power based on the output of the engine 22, and the second MGU 40 may generate electrical power based on rotation of the output shaft 46. Electrical power generated by one of the MGUs 38 and 40 may be used, for example, to power the other of the MGUs 38 and 40, to recharge the battery 42, and/or to power electrical components. While the MGUs 38 and 40 are shown as being located within the transmission 16, the MGUs 38 and 40 may be located in another suitable location.

The control module 20 controls the fuel system 26, the ignition system 28, and the ETC 34. In other words, the control module 20 controls the engine 22. The control module 20 is in communication with an engine speed sensor 48 that measures an engine speed. For example, the engine speed may be based on the rotation of the crankshaft. The engine speed sensor 48 may be located within the engine 22 or at any suitable location, such as near the crankshaft.

The power control module 41 controls the MGUs 38 and 40 and recharging of the battery 42. The power control module 41 controls power flow between the battery 42 and the MGUs 38 and 40. For example only, the power control module 41 may include an inverter and/or an IGBT (insulated gate bipolar transistor). The control module 20 and the power control module 41 communicate with each other.

The power control module 41 may include multiple processors for controlling respective operations of the electric hybrid vehicle 10. For example, the power control module 41 may include a first processor for determining desired torque for the engine 22 and the MGUs 38 and 40 and a second processor for controlling torque of each of the MGUs 38 and 40.

SUMMARY

First, second, and third processor modules selectively execute a test having N test states while an ignition system of the vehicle is off. N is an integer greater than one. The N test states each include: the first processor module setting a first output to a first predetermined value for one of the N test states; the second processor module setting a second output to a second predetermined value for the one of the N test states; the third processor module setting a third output to a third predetermined value for the one of the N test states; a predetermined expectation for the one of the N test states; and at least one of the first, second, and third processor modules indicating a fault when a fourth output is different than the predetermined expectation. A control module sets the fourth output based on the first, second, and third outputs.

A method includes: selectively executing a test having N test states using first, second, and third processor modules while an ignition system of the vehicle is off. N is an integer greater than one. The N test states each include: setting a first output to a first predetermined value for one of the N test states using the first processor module; setting a second output to a second predetermined value for the one of the N test states using the second processor module; setting a third output to a third predetermined value for the one of the N test states using the third processor module; a predetermined expectation for the one of the N test states; and indicating a fault when a fourth output is different than the predetermined expectation using at least one of the first, second, and third processor modules. The method further includes setting the fourth output based on the first, second, and third outputs using a control module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a functional block diagram of an example actuator control system according to the present disclosure;

DETAILED DESCRIPTION

Figure 1:
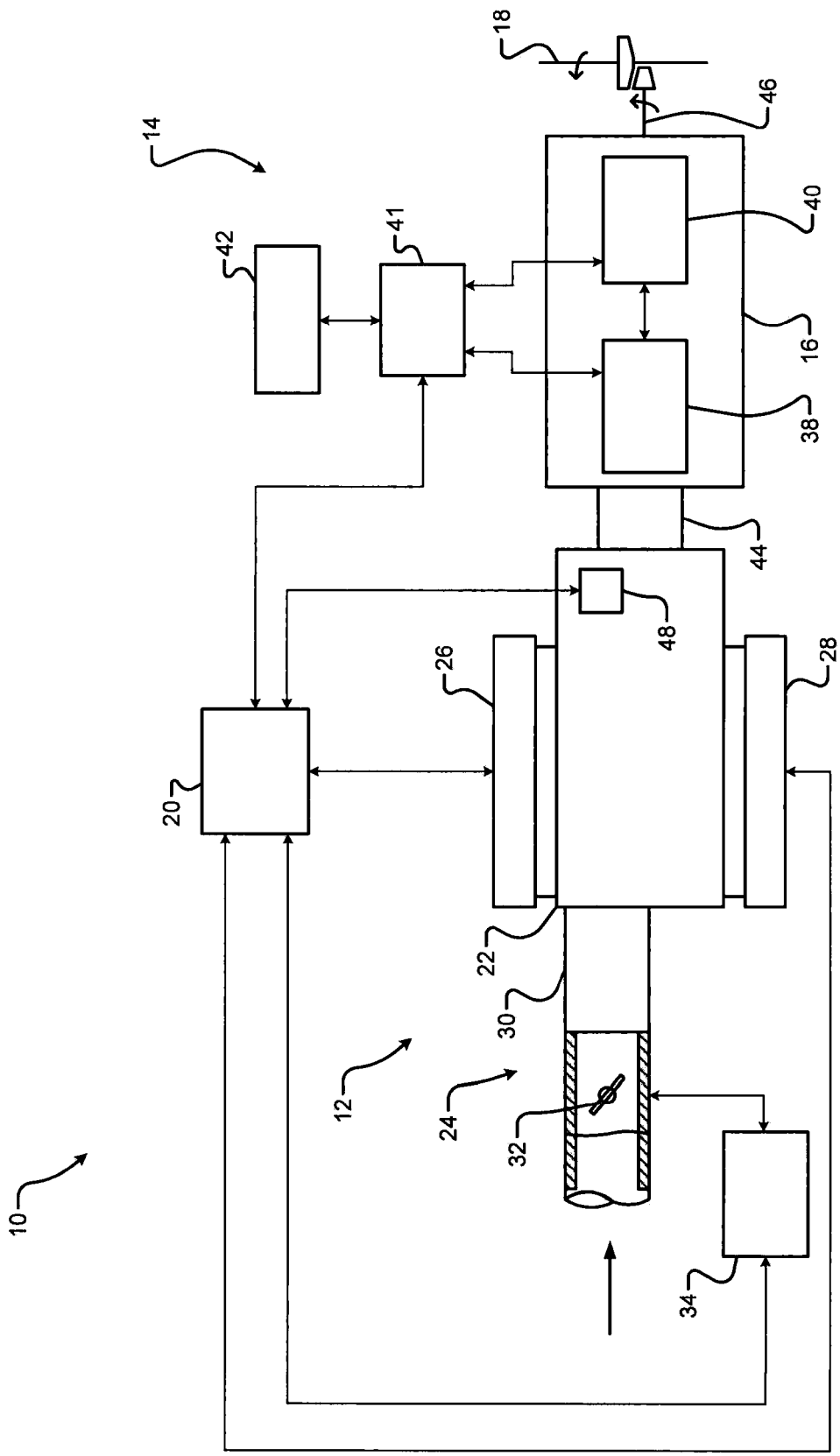
FIG. 1 is a functional block diagram of a hybrid vehicle.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A first processor may control an actuator of a vehicle when an ignition system of the vehicle is on. The first processor and a second processor selectively execute seed/key exchanges while the ignition system is on. For example only, the second processor may transmit a seed to the first processor. The first processor may generate a key based on the seed and transmit the key back to the second processor. A predetermined key is associated with the seed. The second processor may determine that the first processor is not operating properly when the key (received from the first processor) is different than the predetermined key. The second processor may, for example, trigger a command control module to prevent the first processor from controlling the actuator when the first processor is not operating properly.

When the ignition system of the vehicle is turned off, the first and second processors may perform a test to determine whether the first processor, the second processor, and the command control module are operating correctly. The test will be referred to as an inhibit path test (IPT). One or more additional processors may also perform the IPT.

The IPT includes testing what can be referred to as an inhibit path. The inhibit path includes at least the command control module. The IPT involves the processors providing a set of outputs to the command control module that are indicative of improper operation to determine whether the command control module responds as expected.

For example only, during one state of the IPT, the first processor may intentionally transmit a key that is different than a predetermined key to the second processor. The first processor may determine whether the second processor responds as expected to the key being different than the predetermined key. During another state of the IPT, the second processor may intentionally transmit a key that is different than a predetermined key to the first processor and determine whether the first processor responds as expected.

To coordinate execution of the IPT such that the command control module receives a desired combination of outputs from the processors, the processors are synchronized with each other. For purposes of the IPT, one of the processors may be considered a master, and the one or more other processors may be considered slaves. The slaves each provide a status signal to the master that indicates the one of the states of the IPT that the slave is presently in. The master provides a status signal to each of the slaves that indicates the one of the states of the IPT that the master is presently in.

The slaves may selectively enter a next state of the IPT when the master indicates that the master is in the same state as the slaves. The master may enter the next state of the IPT when all of the slaves indicate that the slaves are in the next state. In response to the master indicating that the master is in the next state, the master and the slaves may execute the portion of the IPT corresponding to the next state of the IPT to such that the processors output a desired combination of outputs to the command control module. The master and the slaves may selectively diagnose an IPT failure when a response to the desired combination of outputs associated with the next state of the IPT is different than an expected response for the next state of the IPT. An IPT failure may indicate that one or more of the processors and/or the command control module was unable to identify and respond correctly.

Figure 2:
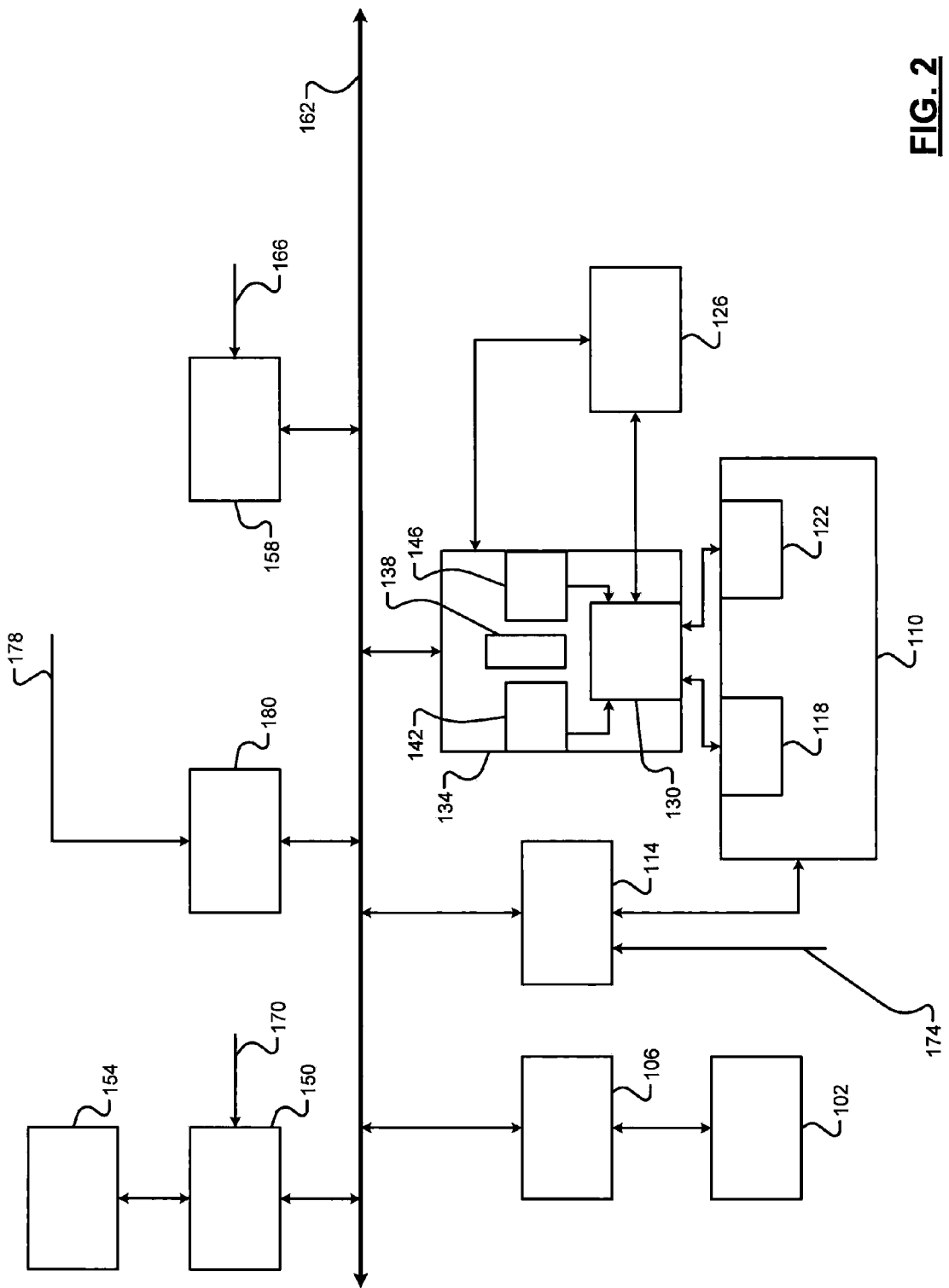
FIG. 2 is a functional block diagram of an example distributed control system of a hybrid vehicle according to the present disclosure.

Referring now to FIG. 2, a functional block diagram of an example distributed control system of a hybrid vehicle is presented. An engine 102 combusts an air/fuel mixture to generate drive torque. An engine control module (ECM) 106 controls the engine 102. Torque output by the engine 102 will be discussed as being positive torque.

The engine 102 may output torque to a transmission 110. A transmission control module (TCM) 114 controls operation of the transmission 110. For example only, the TCM 114 may control gear selection within the transmission 110 and one or more torque transfer devices (e.g., a torque converter, one or more clutches, etc.).

The transmission 110 may include one or more motors or motor generator units (MGUs). For example only, a first MGU (MGU-A) 118 and a second MGU (MGU-B) 122 may be included as in the example embodiment of FIG. 2.

An MGU can act as either a generator or as a motor at a given time. When acting as a generator, an MGU converts mechanical energy into electrical energy. The electrical energy can be, for example, used to charge a battery 126 via a power control device 130. When acting as a motor, an MGU generates torque that may be used, for example, to supplement or replace torque output by the engine 102. In various implementations, one power control device may be provided for each MGU.

A power inverter control module (PIM) 134 may control the MGU-A 118, the MGU-B 122, and the power control device 130. The PIM 134 may be referred to as a transmission power inverter module (TPIM) or a traction power inverter module (TPIM) in various implementations. The PIM 134 may include a hybrid control processor (HCP) module 138, a first motor control processor (MCP-A) module 142, and a second motor control processor (MCP-B) module 146. The HCP module 138 may generate first and second torque requests for the MGU-A 118 and the MGU-B 122. The MCP-A module 142 and the MCP-B module 146 control the MGU-A 118 and the MGU-B 122 based on the first and second torque requests, respectively.

An electronic brake control module (EBCM) 150 may selectively control brakes 154 of the vehicle. A user interface module (UIM) 158 provides one or more driver inputs to a controller area network (CAN) 162. The CAN 162 may also be referred to as a car area network. For example only, the CAN 162 may include a data bus. Various parameters read by a given control module may be made available to other control modules via the CAN 162.

The driver inputs may include, for example, an accelerator pedal position (APP) 166. A brake pedal position (BPP) 170 may be provided to the EBCM 150. A position 174 of a park, reverse, neutral, drive lever (PRNDL) may be provided to the TCM 114. The PRNDL position 174 may also be provided to the PIM 134 in various implementations. An ignition state 178 may be provided to a body control module 180. For example only, the ignition state 178 may be input by a driver via an ignition key, button, or switch. At a given time, the ignition state 178 may be one of off, accessory, run, or crank.

A vehicle may include one or more additional control modules that are not shown, such as a chassis control module, a battery pack control module, etc. A vehicle may omit one or more of the control modules shown and discussed. Each control module may include one or more processors modules. For example only, the PIM 134 includes the HCP module 138, the MCP-A module 142, and the MCP-B module 146. Each processor module includes a processor. The PIM 134 may include one or more other processor modules. The control modules may communicate and receive data via the CAN 162.

Referring now to FIG. 3, a functional block diagram of an actuator control system is presented. A processor module may control an actuator. For example only, the MCP-A module 142 (processor module) controls the MGU-A 118 (actuator). The MCP-A module 142 may, for example, set a motor control command 202 for the MGU-A 118. For example only, the motor control command 202 may include six pulse width modulation (PWM) commands transmitted over six lines. A driver/power control device 206 may receive the motor control command 202. The driver/power control device 206 may provide output via three lines (e.g., for the MGU-A 118 being a three-phase motor) collectively illustrated by 210 that carry current and voltage to and from the MGU-A 118.

Figure 4A:
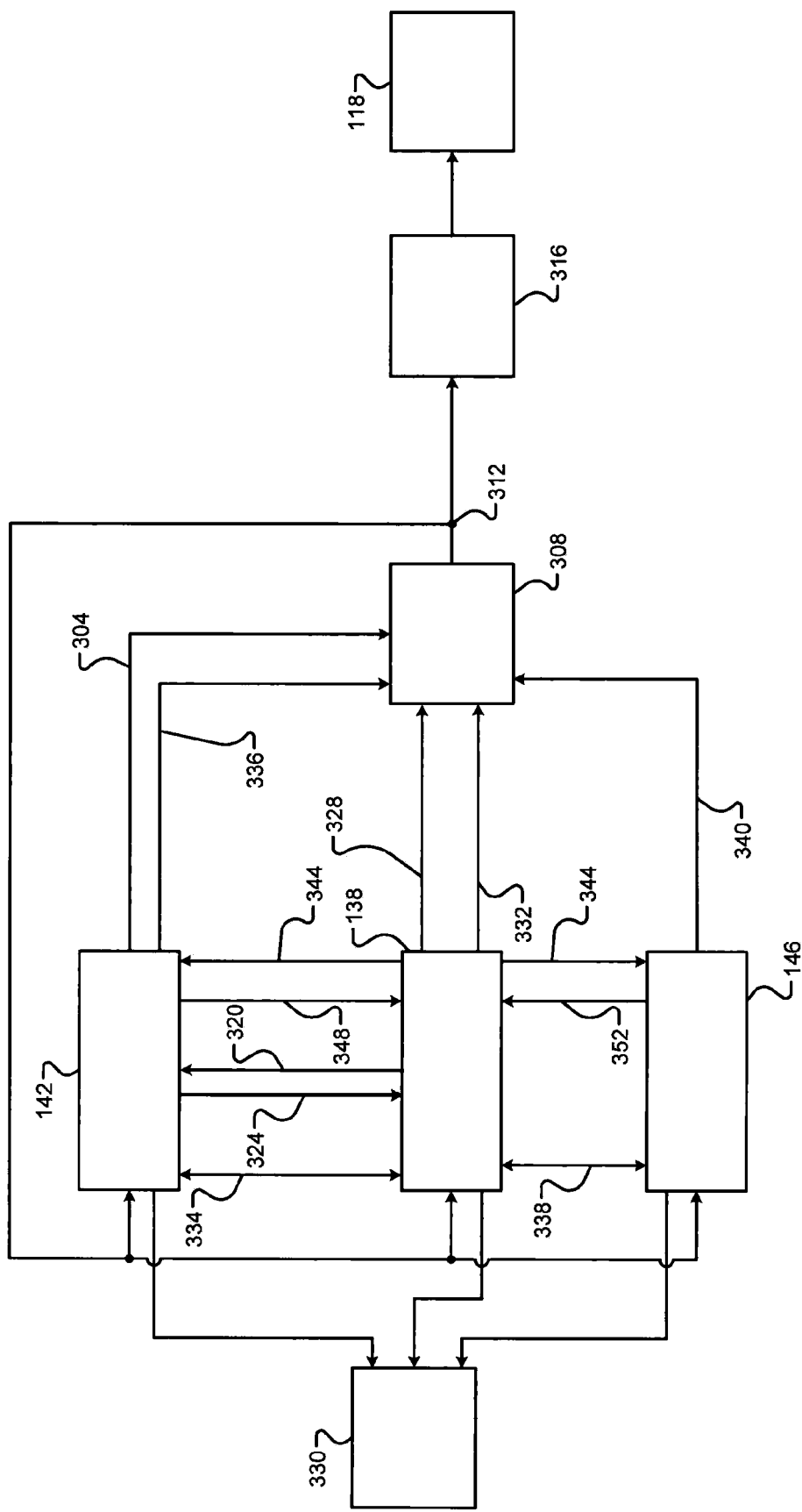
FIGS. 4A-4B are functional block diagrams of example inhibit path systems according to the present disclosure.

Referring now to FIG. 4A, a functional block diagram of an inhibit path system is presented. When a vehicle is shut down, an inhibit path test (IPT) may be performed. More specifically, the IPT may be performed in response to the ignition state 178 transitioning to the OFF state. The IPT may be performed while the ignition system is off (i.e., key off) because its performance may disrupt normal actuator control. In various implementations, the IPT may be performed within a short period after a key on event before torque is needed to propel the vehicle. While the present disclosure is applicable to other processor modules and actuators, for an example only, the present disclosure will be discussed in conjunction with the MCP-A module 142, the MCP-B module 146, the HCP module 138, and the MGU-A 118.

An IPT may additionally or alternatively be performed in association with one or more other actuators of a vehicle when the vehicle is shut down, such as a high voltage contactor, a clutch solenoid, a CAN bus driver, etc. For purposes of the example embodiment of FIG. 4A, the MGU-A 118 includes a permanent magnet (PM) motor. An example inhibit path system for an implementation where the MGU-A 118 includes an induction motor is presented in the example embodiment of FIG. 4B.

The IPT may be performed via N processors where N is an integer greater than one. For example only, the IPT will be discussed in conjunction with the three processors of the MCP-A module 142, the MCP-B module 146, and the HCP module 138 in the example of FIG. 4A. One of the processors is considered a master for purposes of the IPT, and the other (N−1) processors are considered slaves for purposes of the IPT. For example only, the processor of the HCP module 138 may be the master, and the processors of the MCP-A module 142 and the MCP-B module 146 may be the slaves in the example of FIG. 4A.

One of the slaves controls the actuator during normal operation while the ignition state 178 is on. For example only, the MCP-A module 142 controls the MGU-A 118. The MCP-A module 142 may control the MGU-A 118 via a first command 304. For example only, the MCP-A module 142 may generate the first command 304 based on a torque request for the MGU-A 118 during normal operation. The MCP-A module 142 may receive the torque request for the MGU-A 118 from the HCP module 138.

The MCP-A module 142 may output the first command 304 to a command control module 308. The command control module 308 may set a final command 312 based on the first command 304 when the MCP-A module 142 is functioning properly. A motor driver module 316 may control the power applied to the MGU-A 118 based on the final command 312. The motor driver module 316 may include one or more power control devices.

The MCP-A module 142 and the HCP module 138 may selectively execute seed/key exchanges while the ignition state 178 is on to verify the proper operation of the MCP-A module 142 and the HCP module 138. The seed/key exchanges may be performed as part of a test that may be referred to as a key fault test. An example seed/key exchange may involve the HCP module 138 first generating a seed 320 and transmitting the seed 320 to the MCP-A module 142.

The MCP-A module 142 then generates a key 324 based on the seed 320 and transmits the key 324 to the HCP module 138. The HCP module 138 may determine an expected key (not shown) based on the seed 320 and compare the key 324 to the expected key.

When the expected key is different than the key 324, the MCP-A module 142 may not be operating properly, and the HCP module 138 may generate one or more inhibit signals to shut down or limit operation of the MGU-A 118. When the MGU-A 118 includes a PM motor, as in the example embodiment of FIG. 4A, the inhibit signals may include a 3-phase short command 328 and/or a 3-phase open command 332. The inhibit signals may be set based on one or more operating conditions. One or more other remedial actions may additionally or alternatively be taken, such as setting a diagnostic trouble code (DTC) in memory (not shown), illuminating an indicator 330, such as a malfunction indicator lamp (MIL), and/or one or more other suitable remedial actions.

When the expected key is different than the key 324, the HCP module 138 may set the states of the 3-phase short command 328 and the 3-phase open command 332 based on a speed of the MGU-A 118. For example only, the HCP module 138 may set the 3-phase short command 328 to an active state (e.g., digital 1) and the 3-phase open command 332 to an inactive state (e.g., digital 0) when the speed of the MGU-A 118 is greater than a predetermined speed (that is greater than zero). When the speed of the MGU-A 118 is less than the predetermined speed, the HCP module 138 may set the 3-phase short command 328 to the inactive state and the 3-phase open command 332 to the active state.

When at least one of the 3-phase short command 328 and the 3-phase open command 332 are in the active state, the command control module 308 does not set the final command 312 to the first command 304. In this manner, the command control module 308 blocks the MCP-A module 142 from controlling the final command 312. Instead, the command control module 308 sets the final command 312 based on one of the 3-phase short command 328 and the 3-phase open command 332 that is in the active state. When both of the 3-phase short command 328 and the 3-phase open command 332 are in the active state, the command control module 308 may be expected to set the final command 312 based on the 3-phase short command 328. In this manner, the MGU-A 118 can be shut down or limited if the HCP module 138 determines that the MCP-A module 142 is not functioning properly.

The MCP-A module 142 may also perform a seed/key exchange 334 to determine a state of health (SOH) of the HCP module 138. For example, the MCP-A module 142 may generate a seed and determine an expected key based on the seed. The HCP module 138 may generate a key based on the seed and return the key to the MCP-A module 142. When the key returned by the HCP module 138 is the same as the expected key, the MCP-A module 142 may set a first HCP SOH 336 to the inactive state. The MCP-A module 142 may set the first HCP SOH 336 to the active state when the key and the expected key are different.

The MCP-B module 146 may similarly perform a seed/key exchange 338 to determine a second SOH of the HCP module 138. For example, the MCP-B module 146 may generate a seed and determine an expected key based on the seed. The HCP module 138 may determine a key based on the seed and return the key to the MCP-B module 146. The MCP-B module 146 may set a second HCP SOH 340 to the inactive state when the key and the expected key are the same. When the key and the expected key are different, the MCP-B module 146 may set the second HCP SOH 340 to the active state. The MCP-B module 146 and the second HCP SOH 340 may be included to break ties. For example only, the second HCP SOH 340 can indicate that the HCP module 138 is the one that is acting improperly when the MCP-A module 142 and the HCP module 138 both indicate that their received keys are different than the expected keys.

The MCP-A module 142, the MCP-B module 146, and the HCP module 138 may begin executing the IPT in response to the ignition state 178 transitioning to off. The IPT involves the MCP-A module 142, the MCP-B module 146, and the HCP module 138 selectively generating a combination of one or more outputs that indicate improper operation and monitoring whether a response to the outputs is the same as an expected response. The IPT may be performed in a predetermined number of states.

The master indicates the one of the IPT states that the master is in to each of the slaves. The slaves each indicate the one of the IPT states that the slaves are in, respectively, to the master. For example, the HCP module 138 provides an HCP state 344 to the MCP-A module 142 and the MCP-B module 146. The HCP state 344 indicates the one of the IPT states that the HCP module 138 is presently in. The MCP-A module 142 provides an MCP-A state 348 to the HCP module 138. The MCP-A state 348 indicates the one of the IPT states that the MCP-A module 142 is presently in. The MCP-B module 146 provides an MCP-B state 352 to the HCP module 138. The MCP-B state 352 indicates the one of the IPT states the MCP-B module 146 is presently in. The IPT states are performed in a predetermined order. Routines for each of the MCP-A module 142, the MCP-B module 146, and the HCP module 138 may be stored in memory (not shown).

The slaves may enter a given IPT state when one or more enabling conditions are satisfied for that IPT state. The master may enter that IPT state when the one or more enabling conditions are satisfied for that IPT state and each of the slaves are in that IPT state. Once the master is in that IPT state, the slaves and the master may execute their respective functions associated with the IPT state. The slaves may enter a next IPT state when the master is in the same IPT state as the slaves and one or more enabling conditions are satisfied for the next IPT state. The master may enter the next IPT state when the one or more enabling conditions are satisfied for the next IPT state and each of the slaves is in the next IPT state. In this manner, the slaves and the master are synchronized throughout the IPT for performing each IPT state.

As broadly described above, the IPT involves purposely simulating improper operation to determine if the inhibit path system responds as expected to the simulated improper operation. For example only, the states of the IPT may include an IPT waiting state, an IPT pending state, an IPT enabled state, a phase-1 state, a phase-1 complete state, a phase-2 state, a completed state, and an abort state.

When the ignition state 178 transitions to on, the MCP-A module 142, the MCP-B module 146, and the HCP module 138 may enter the IPT waiting state. The MCP-A module 142 and the MCP-B module 146 indicate to the HCP module 138 that they are in the IPT waiting state via the MCP-A state 348 and the MCP-B state 352, respectively. The HCP module 138 may indicate to the MCP-A module 142 and the MCP-B module 146 that the HCP module 138 is in the IPT waiting state via the HCP state 344.

The MCP-A module 142 may enter the IPT pending state when the HCP module 138 is in the IPT waiting state and the MCP-A module 142 determines that the phase-1 state enabling conditions are satisfied. For example only, the phase-1 state enabling conditions may include the ignition state 178 being off, the IPT error signal has not been generated, the MCP-A module 142 and the MCP-B module 146 are not controlling the MGU-A 118 and the MGU-B 122, respectively, the HCP module 138 be in the IPT waiting state, and one or more other IPT pending state enabling conditions. The MCP-B module 146 may enter the IPT pending state when the HCP module 138 is in the IPT waiting state and the MCP-B module 146 determines that the phase-1 state enabling conditions are satisfied. The HCP module 138 may enter the IPT pending state when the HCP module 138 determines that the phase-1 state enabling conditions are satisfied and both the MCP-A module 142 and the MCP-B module 146 are in the IPT pending state.

The MCP-A module 142 may enter the IPT enabled state when the HCP module 138 is in the IPT pending state and the MCP-A module 142 determines that the phase-1 state enabling conditions are satisfied. The MCP-B module 146 may enter the IPT enabled state when the HCP module 138 is in the IPT pending state and the MCP-B module 146 determines that the phase-1 state enabling conditions are satisfied. The HCP module 138 may enter the IPT enabled state when the HCP module 138 determines that the phase-1 state enabling conditions are satisfied and both the MCP-A module 142 and the MCP-B module 146 are in the IPT enabled state.

The MCP-A module 142 may enter the phase-1 state when the HCP module 138 is in the IPT enabled state, the MCP-A module 142 determines that the phase-1 state enabling conditions are satisfied, and the key fault test (above) has completed and passed. The MCP-B module 146 may enter the phase-1 state when the HCP module 138 is in the IPT enabled state, the MCP-B module 146 determines that the phase-1 state enabling conditions are satisfied, and the key fault test has completed and passed. The HCP module 138 may enter the phase-1 state when the HCP module 138 determines that the phase-1 state enabling conditions are satisfied, both the MCP-A module 142 and the MCP-B module 146 are in the phase-1 state, and the key fault test has completed and passed.

The phase-1 state may include verifying that the command control module 308 responds correctly, as indicated by the final command 312, to each set of possible outputs from the MCP-A module 142, the MCP-B module 146, and the HCP module 138. The phase-2 may include verifying that a system properly controls (e.g., blocks) communication between a processor and the CAN 162 when the processor is and is not operating properly. The phase-2 state is discussed in detail in commonly assigned U.S. patent application Ser. No. 13/052,506, filed on Mar. 21, 2011, which is incorporated by reference in its entirety.

The phase-1 state includes applying each possible combination of the first HCP SOH 336, the second HCP SOH 340, the 3-phase short command 328, and the 3-phase open command 332 to the command control module 308. The phase-1 state may also include the MCP-A module 142, the HCP module 138, and the MCP-B module 146 each monitoring whether the response of the command control module 308 (i.e., the final command 312) to each of the possible combinations is proper. The phase-1 state also includes the MCP-A module 142 setting the first command 304 such that whether the command control module 308 sets the final command 312 based on the first command 304 or based on the 3-phase short or open commands 328 or 332 can be verified.

The number of the possible combinations is equal to $2^M$ where M is the number of commands applied to the command control module 308. For example only, M is equal to 4 for the first HCP SOH 336, the second HCP SOH 340, the 3-phase short command 328, and the 3-phase open command 332. Accordingly, there are 16 (i.e., $2^4$) possible combinations of the first HCP SOH 336, the second HCP SOH 340, the 3-phase short command 328, and the 3-phase open command 332. The combinations may be achieved, for example, using seed/key exchanges where keys that are different than the expected keys are intentionally transmitted to achieve the combinations of the first HCP SOH 336, the second HCP SOH 340, the 3-phase short command 328, and the 3-phase open command 332.

An example table of the possible combinations of the first HCP SOH 336 (1HCP SOH), the second HCP SOH 340 (2HCP SOH), the 3-phase short command 328 (3-Phs Short), and the 3-phase open command 332 (3-Phs Open) is provided below. The table also includes the first command 304 (MCP command) for each of the possible combinations, an expectation for the final command 312 for each of the possible combinations, and actions taken by the command control module 308 to achieve the expectations for each of the possible combinations. Values of 1 may correspond to the active state, and values of 0 may correspond to the inactive state.

| No. | MCP Command 304 | 1HCP SOH 336 | 2HCP SOH 340 | 3-Phs Open 332 | 3-Phs Short 328 | Expected Feedback (Final Command 312) | Expected action of Command Control Module |
|---|---|---|---|---|---|---|---|
| 1 | Open | 0 | 0 | 0 | 0 | Open | MCP commands actuator |
| 2 | Open | 0 | 0 | 0 | 1 | Short | MCP blocked |
| 3 | Short | 0 | 0 | 1 | 0 | Open | MCP blocked |
| 4 | Open | 0 | 0 | 1 | 1 | Short | MCP blocked |
| 5 | Open | 0 | 1 | 0 | 0 | Open | MCP commands actuator |
| 6 | Open | 0 | 1 | 0 | 1 | Short | MCP blocked |
| 7 | Short | 0 | 1 | 1 | 0 | Open | MCP blocked |
| 8 | Open | 0 | 1 | 1 | 1 | Short | MCP blocked |
| 9 | Open | 1 | 0 | 0 | 0 | Open | MCP commands actuator |
| 10 | Open | 1 | 0 | 0 | 1 | Short | MCP blocked |
| 11 | Short | 1 | 0 | 1 | 0 | Open | MCP blocked |
| 12 | Open | 1 | 0 | 1 | 1 | Short | MCP blocked |
| 13 | Short | 1 | 1 | 0 | 0 | Short | MCP commands actuator |
| 14 | Open | 1 | 1 | 0 | 1 | Open | MCP commands actuator |
| 15 | Short | 1 | 1 | 1 | 0 | Short | MCP commands |

| No. | MCP Command 304 | 1HCP SOH 336 | 2HCP SOH 340 | 3-Phs Open 332 | 3-Phs Short 328 | Expected Feedback (Final Command 312) | Expected action of Command Control Module |
|---|---|---|---|---|---|---|---|
| 16 | Open | 1 | 1 | 1 | 1 | Open | actuator MCP commands actuator |

Each of the applications of a possible combination of the first HCP SOH 336, the second HCP SOH 340, the 3-phase short command 328, and the 3-phase open command 332 may be considered a state of the IPT (e.g., a sub-state of the phase-1 state). The one or more enabling conditions for the sub-states may be the one or more phase-1 state enabling conditions discussed above.

Once the MCP-A module 142, the MCP-B module 146, and the HCP module 138 are in a given one of the sub-states, the MCP-A module 142, the MCP-B module 146, and the HCP module 138 output the combination that is associated with the given sub-state. The MCP-A module 142 also sets the first command 304 for the given sub-state. The MCP-A module 142, the MCP-B module 146, and the HCP module 138 monitor the final command 312 and compare the final command 312 to the expectation for the final command 312 that is associated with the given sub-state. The MCP-A module 142, the MCP-B module 146, and/or the HCP module 138 may selectively indicate that the IPT failed if the final command 312 is different than the expectation.

If the expectation and the final command 312 are the same and the HCP module 138 is in the same sub-state as the MCP-A module 142 and the MCP-B module 146, the MCP-A module 142 and the MCP-B module 146 may selectively enter a next sub-state (or next IPT state). The next sub-state corresponds to another one of the possible combinations. When the MCP-A state 348 and the MCP-B state 352 indicate that the MCP-A module 142 and the MCP-B module 146 are in the next state, the HCP module 138 may selectively enter the next state. When the HCP state 344 indicates that the HCP module 138 is in the next state, the MCP-A module 142, the MCP-B module 146, and the HCP module 138 may output the combination that is associated with the next sub-state.

If the expectation and the final command 312 are different, an IPT error signal may be generated. The IPT may be deemed failed when the IPT error signal is generated. A counter (e.g., a nonvolatile counter) may be incremented each time that the IPT error signal is generated. When the counter is greater than a predetermined value when the ignition system is turned on (e.g., key on), operation of the vehicle may be disabled and/or one or more remedial actions may be taken, such as limiting vehicle performance to allow the vehicle to be operated in a limp mode. One or more other remedial actions may additionally or alternatively be taken when the IPT error signal is generated (the IPT failed), such as setting a diagnostic trouble code (DTC) in the memory, illuminating the indicator 330 and/or one or more other suitable remedial actions.

Execution of the phase-1 state may proceed above until the IPT fails or each of the possible combinations have been applied and monitored. The MCP-A module 142 may enter the phase-1 completed state when the HCP module 138 is in the phase-1 state and all of the possible combinations (each of the sub-states) has been completed. The MCP-B module 146 may enter the phase-1 completed state when the HCP module 138 is in the phase-1 state and all of the possible combinations has been completed. The HCP module 138 may enter the phase-1 completed state when the both the MCP-A module 142 and the MCP-B module 146 are in the phase-1 completed state and all of the possible combinations has been completed.

The MCP-A module 142 may enter the phase-2 state when the HCP module 138 is in the phase-1 completed state and one or more phase-2 enabling conditions are satisfied. The MCP-B module 146 may enter the phase-2 state when the HCP module 138 is in the phase-1 completed state and the one or more phase-2 enabling conditions are satisfied. The HCP module 138 may enter the phase-2 state when the both the MCP-A module 142 and the MCP-B module 146 are in the phase-2 state and the HCP module 138 determines that the one or more phase-2 enabling conditions are satisfied.

If the ignition state 178 transitions to on during the IPT before the IPT complete state, the MCP-A module 142 and the MCP-B module 146 may enter the IPT aborted state. The MCP-A module 142 and the MCP-B module 146 may also enter the IPT aborted state when one or more of the phase-1 and/or phase-2 enabling conditions are not met within a predetermined period or the IPT failed. When the MCP-A state 348 and the MCP-B state 352 indicate that the MCP-A module 142 and the MCP-B module 146 are in the IPT aborted state, the HCP module 138 may enter the IPT aborted state.

Figure 4B:
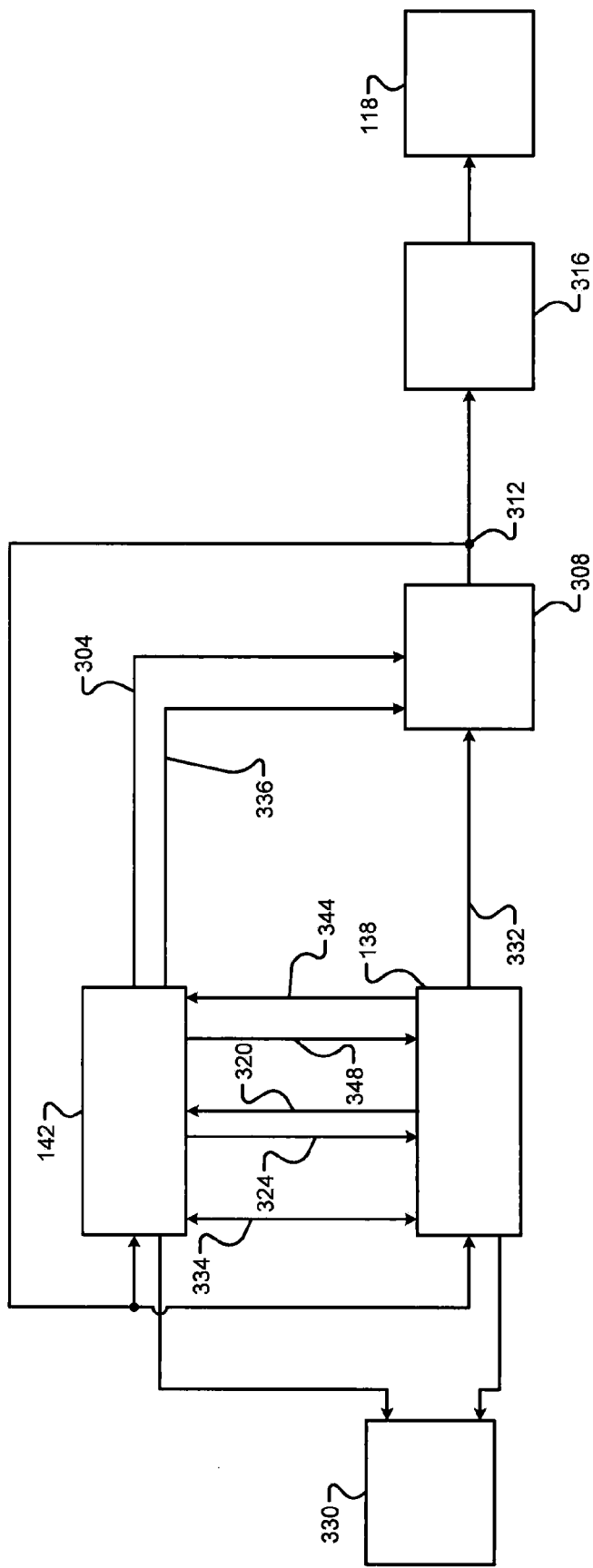

Referring now to FIG. 4B, a functional block diagram of an example inhibit path system where the MGU-A 118 includes an induction motor is presented. When the MGU-A 118 includes an induction motor, the 3-phase short command 328 may be omitted and only the 3-phase open command 332 may be used. The HCP module 138 may set the 3-phase open command 332 to the active state in response to the MCP-A module 142 providing a key that is different than an expected key. Accordingly, the number of possible combinations for purposes of the IPT (e.g., the phase-1 state) may be less than the number of possible combinations described in conjunction with the example of FIG. 4A. While only the MCP-A module 142 and the HCP module 138 are illustrated in the example of FIG. 4B, one or more additional processor modules (e.g., the MCP-B module 146 as in the example of FIG. 4B) may also be used.

Figure 5A:
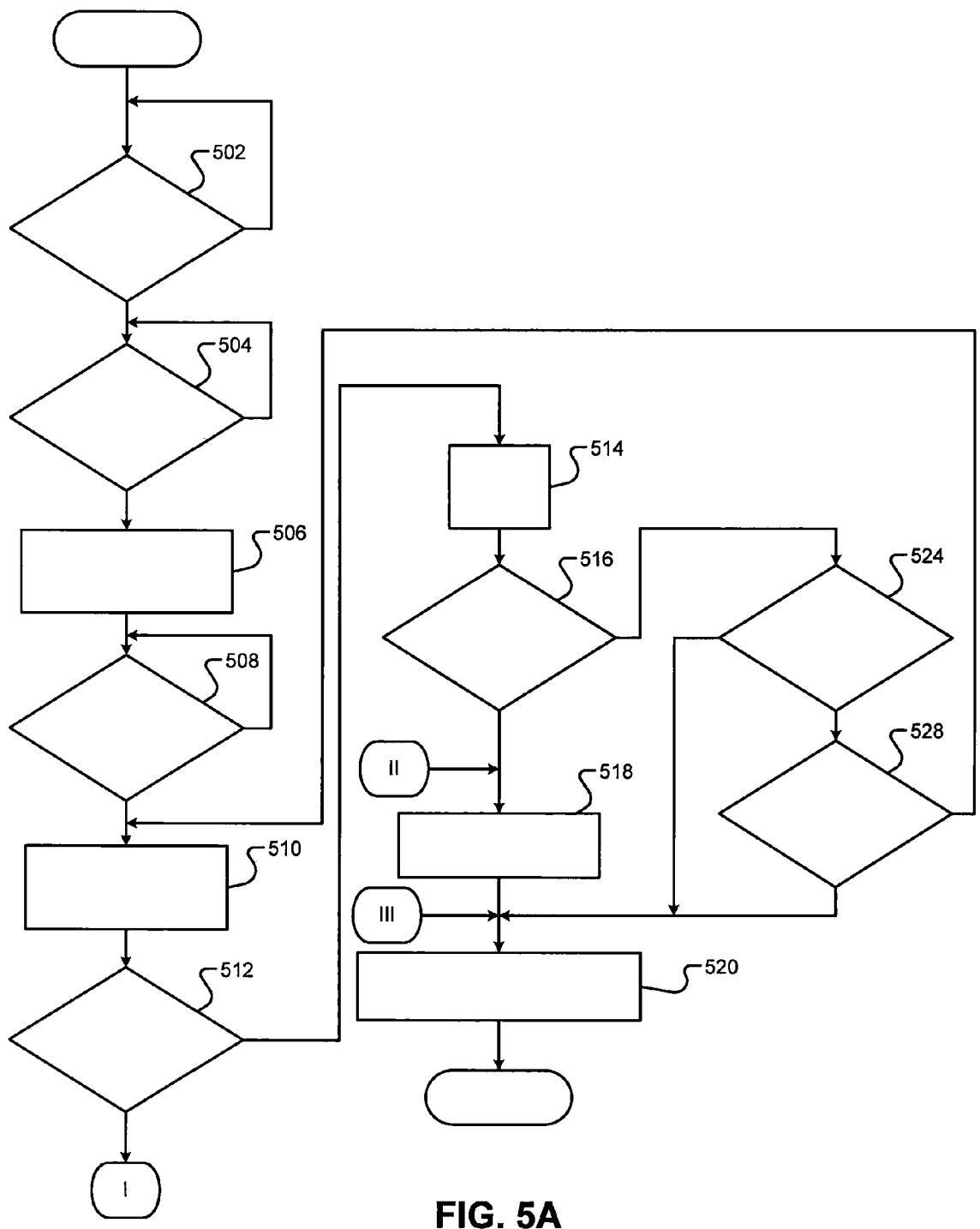
FIGS. 5A-5B illustrate an example method of executing an inhibit path test using two or more slave processor modules according to the present disclosure.
Figure 5B:
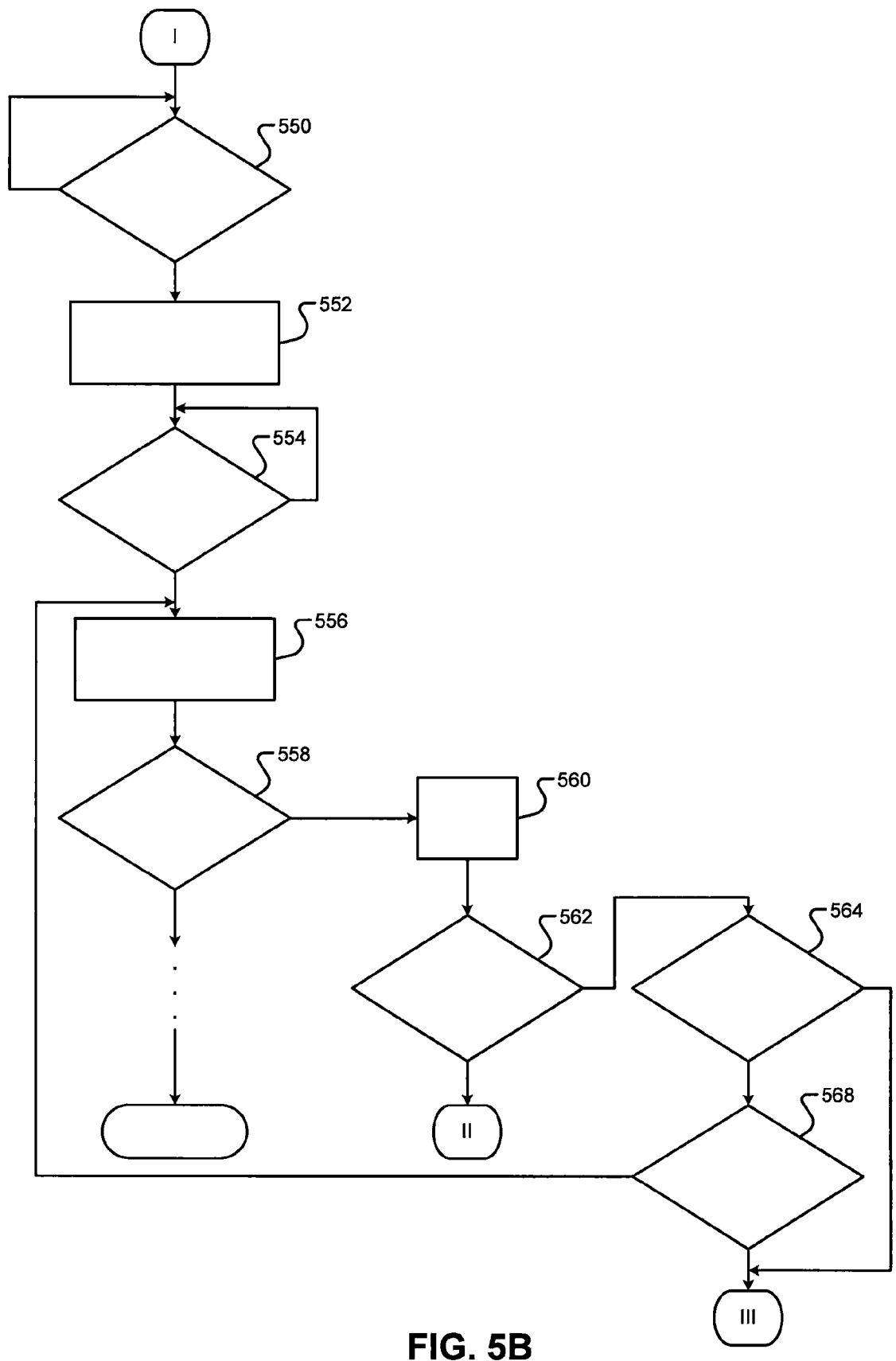

Referring now to FIGS. 5A-5B, a flowchart of an example method performed by each slave (e.g., the MCP-A module 142 and the MCP-B module 146 in the examples of FIGS. 4A-4B) for the phase-1 state of the IPT is presented. Referring now to FIG. 5A, control may begin with 502 where each of the slaves determine whether the ignition state 178 is off. If true, control continues with 504. If false, control remains at 502.

At 504, each of the slaves determines whether the enabling conditions for the first state of the IPT are satisfied. If true, control proceeds with 506; if false, control may remain at 504. At 506, the slaves each enter the first state. Each of the slaves indicates which state it is in at a present time to the master.

Each of the slaves determines whether the master is indicating that the master is in the first state at 508. If true, control proceeds to 510. If false, control may remain at 508. At 510, the slaves each execute their respective functions associated with the first state of the IPT.

Each of the slaves determines whether a response is the same as an expected response for the first state of the IPT at 512. In other words, each of the slaves determines whether the inhibit path system responded correctly at 512. If true, control may continue with 550 of FIG. 5B. If false, control may update a timer at 514 and continue with 516. The timer values tracks the period that the slaves have been performing the functions for the first state of the IPT.

At 516, each of the slaves may determine whether the timer is greater than a predetermined value (e.g., period). If false, control may transfer to 524. If true, one or more of the slaves may indicate that the IPT failed at 518, and continue with 520. At 520, each of the slaves may enter the IPT aborted state and indicate that it is in the IPT aborted state to the master. Control may end.

At 524, the slaves may each determine whether the enabling conditions for the first state of the IPT are still satisfied. If true, control may continue with 528. If false, each of the slaves may enter and indicate that it is in the IPT aborted state at 520 and end. Each slave may determine whether the master is indicating to it (the slave) that the master is in the IPT aborted state at 528. If true, each of the slaves may enter and indicate that it is in the IPT aborted state at 520 and end. If false, control may return to 510.

Referring now to FIG. 5B, each of the slaves may determine whether the enabling conditions for the second state of the IPT are satisfied at 550. The enabling conditions for the second state of the IPT may be the same as the enabling conditions for the first state of the IPT. If true, control may continue with 552; if false, control may remain at 550. At 552, each of the slaves may enter the second state of the IPT. At 554, each of the slaves may determine whether the master is in the second state of the IPT. If true, control may continue with 556; if false, control may remain at 554.

At 556, each of the slaves may execute their respective functions for the second state of the IPT. At 558, each of the slaves determines whether a response is the same as an expected response for the second state of the IPT. If true, control may proceed similarly for each state of the IPT until the IPT fails or each of the states of the IPT have been completed. If false, control may update a second timer at 560 and continue with 562. The second timer values tracks how long the slaves have been performing the functions for the second state of the IPT.

At 562, each of the slaves may determine whether the second timer is greater than a predetermined value (e.g., period). If true, one or more of the slaves may indicate that the IPT failed at 518 and continue with 520. If false, control may transfer to 564. At 564, the slaves may each determine whether the enabling conditions for the second state of the IPT are still satisfied. If true, control may continue with 568; if false, each of the slaves may enter and indicate that it is in the IPT aborted state at 520 and control may end. Each slave may determine whether the master is indicating to it that the master is in the IPT aborted state at 568. If true, each of the slaves may enter and indicate that it is in the IPT aborted state at 520 and end. If false, control may return to 556.

Figure 6A:
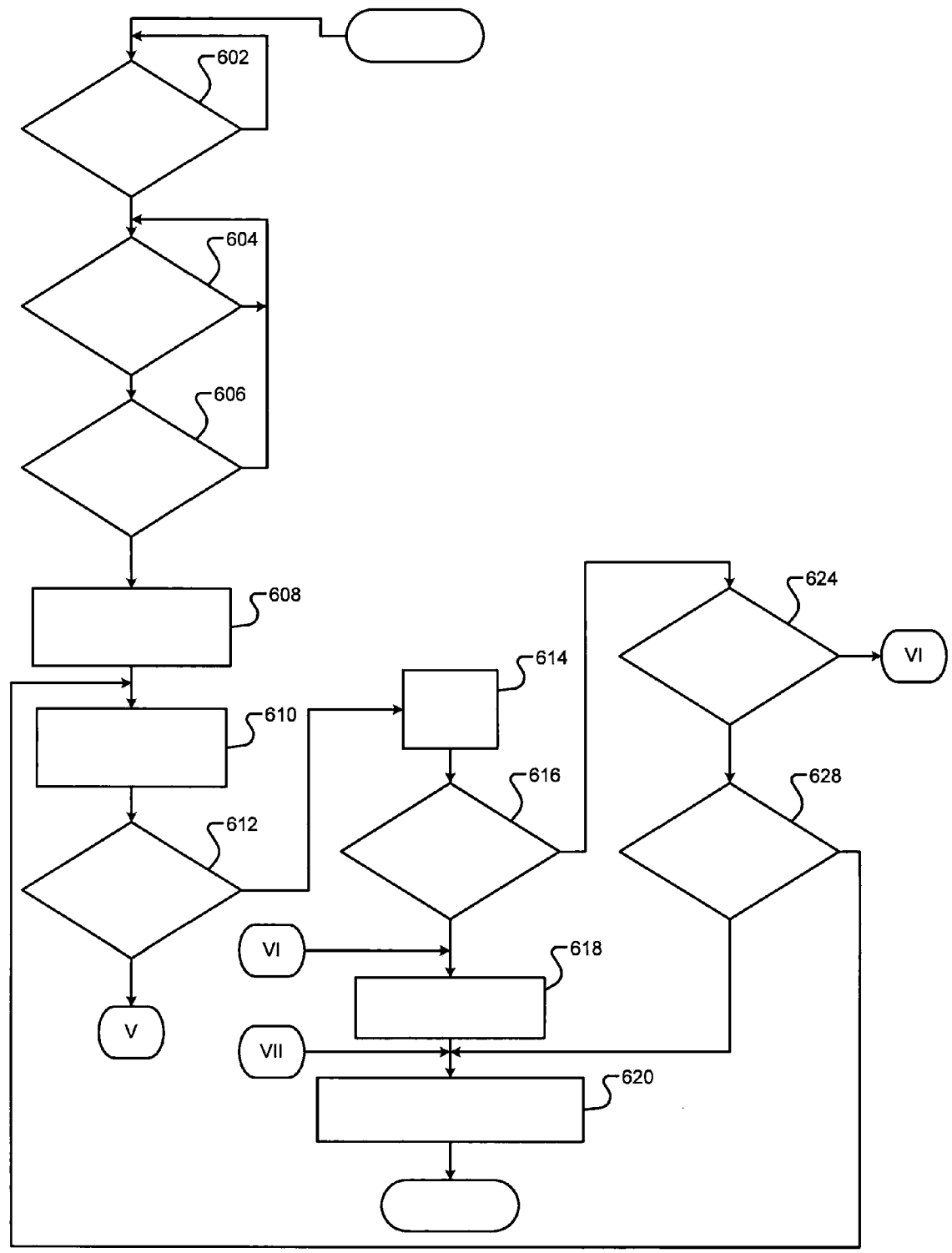
FIGS. 6A-6B illustrate an example method of executing the inhibit path test using a master processor module according to the present disclosure.
Figure 6B:
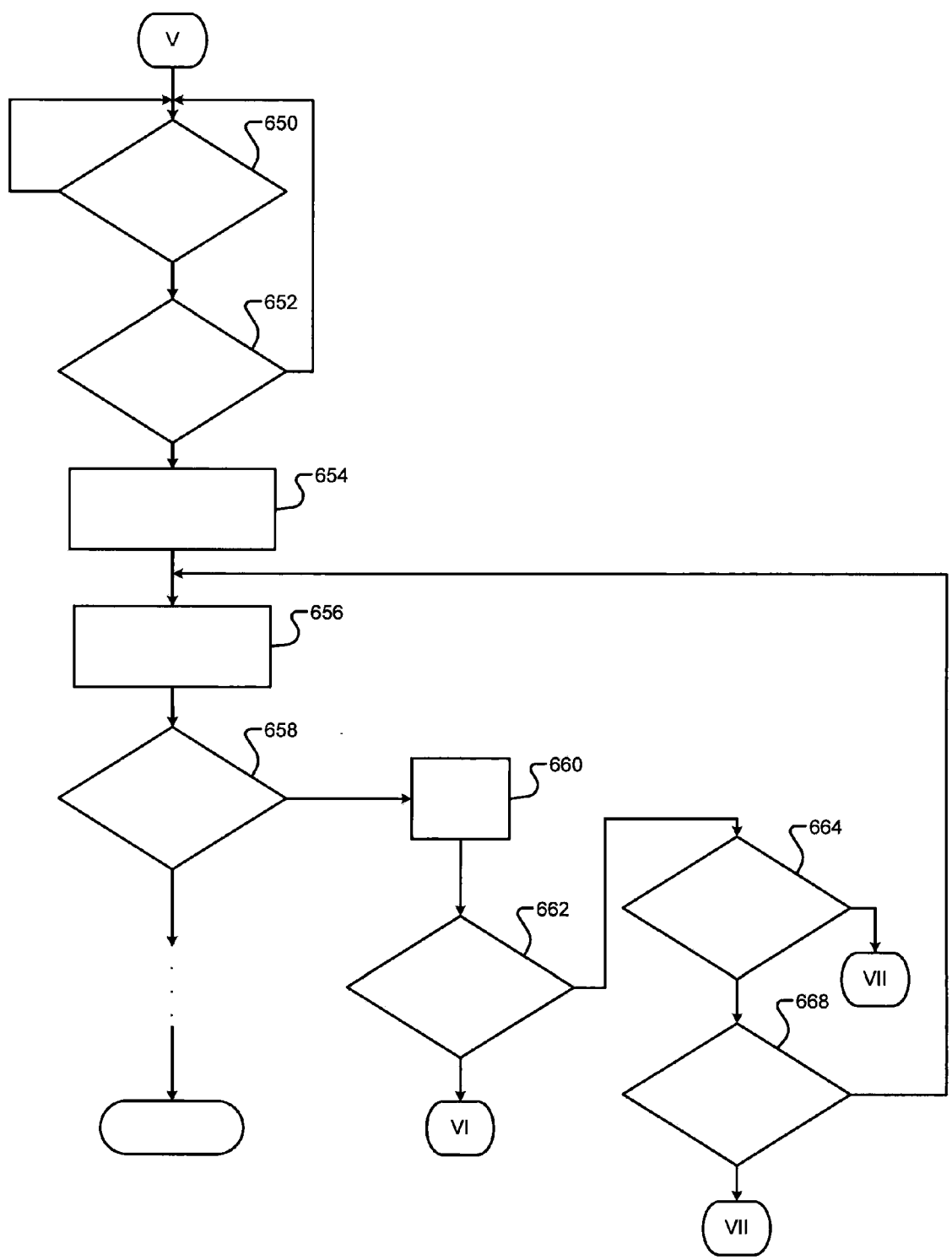

Referring now to FIGS. 6A-6B, a flowchart of an example method performed by a master (e.g., the HCP module 138 in the examples of FIGS. 4A-4B) for the phase-1 state of the IPT is presented. Referring to FIG. 6A, control may begin with 602 where the master determines whether the ignition state 178 is off. If true, control continues with 604. If false, control remains at 602.

At 604, the master determines whether the enabling conditions for the first state of the IPT are satisfied. If true, control proceeds with 606; if false, control may remain at 604. At 606, the master determines whether each of the slaves is in the first state. If true, control may proceed with 608; if false, control may return to 604. The master may enter the first state of the IPT at 608. The master indicates which state it is in at a present time to each of the slaves.

The master executes its function associated with the first state of the IPT at 610. The master determines whether a response is the same as an expected response for the first state of the IPT at 612. In other words, the master determines whether the inhibit path system responded correctly at 612. If true, control may continue with 650 of FIG. 5B. If false, control may update a timer at 614 and continue with 616. The timer values tracks the period that the master has been performing its function for the first state of the IPT.

At 616, the master determines whether the timer is greater than a predetermined value (e.g., period). If false, control may transfer to 624. If true, the master may indicate that the IPT failed at 618, and continue with 620. The master may enter the IPT aborted state and indicate to each of the slaves that the master is in the IPT aborted state at 620.

At 624, the master may determine whether the enabling conditions for the first state of the IPT are still satisfied. If true, control may continue with 628. If false, the may enter the IPT aborted state and indicate to each of the slaves that the master is in the IPT aborted state at 620, and control may end. At 628, the master may determine whether one or more of the slaves is in the IPT aborted state. If true, the master may enter the IPT aborted state and indicate to each of the slaves that the master is in the IPT aborted state at 620, and control may end. If false, control may return to 610.

Referring now to FIG. 6B, the master may determine whether the enabling conditions for the second state of the IPT are satisfied at 650. If true, control may continue with 652; if false, control may remain at 650. At 652, the master may determine whether each of the slaves is in the second state of the IPT. If true, control may continue with 654. If false, control may return to 650. At 654, the master may enter the second state of the IPT and indicate that the master is in the second state to each of the slaves.

At 656, the master may execute its functions for the second state of the IPT. At 658, the master determines whether a response is the same as an expected response for the second state of the IPT. If true, control may proceed similarly for each state of the IPT until the IPT fails or each of the states of the IPT have completed and passed. If false, control may update a second timer at 660 and continue with 662. The second timer values tracks how long the master has been performing its functions for the second state of the IPT.

At 662, the master may determine whether the second timer is greater than a predetermined value (e.g., period). If true, the master may indicate that the IPT failed at 618, and control may end. If false, control may transfer to 664. At 664, the master may determine whether the enabling conditions for the second state of the IPT are still satisfied. If true, control may continue with 668. If false, the master may enter the IPT aborted state and indicate that the master is in the IPT aborted state to each of the slaves at 520, and control may end. At 668, the master may determine whether one or more of the slaves is in the IPT aborted state. If false, control may return to 656.

If true, the master may enter the IPT aborted state and indicate that the master is in the IPT aborted state to each of the slaves at 520, and control may end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system of a vehicle, comprising:
    first, second, and third processor modules that selectively execute a test having N test states while an ignition system of the vehicle is off,
    wherein N is an integer greater than one and the N test states each include:
        the first processor module setting a first output to a first predetermined value for one of the N test states;
        the second processor module setting a second output to a second predetermined value for the one of the N test states;
        the third processor module selling a third output to a third predetermined value for the one of the N test states;
        a predetermined expectation for the one of the N test states; and
        at least one of the first, second, and third processor modules indicating a fault when a fourth output is different than the predetermined expectation; and
    a control module that sets the fourth output based on the first, second, and third outputs.

2. The system of claim 1 wherein:
    the first processor module generates a fifth output; and
    the control module sets the fourth output to one of the second and fifth outputs based on the first, second, and third outputs.

3. The system of claim 2 further comprising a driver module that drives an actuator of the vehicle based on the fourth output.

4. The system of claim 3 wherein the actuator is an electric motor.

5. The system of claim 2 further comprising a motor driver module that applies power to an electric motor of the vehicle based on the fourth output,
    wherein the control module selectively sets the fourth output to the fifth output when the ignition system of the vehicle is on.

6. The system of claim 5 wherein the control module sets the fourth output to the second output when the ignition system of the vehicle is on and a fault has been indicated.

7. The system of claim 5 wherein, when the ignition system of the vehicle is on, the first processor module generates the fifth output based on a torque request generated by the second processor module for the electric motor.

8. The system of claim 1 wherein:
    the first processor module generates a fifth output;
    the second processor module generates a sixth output; and
    the control module sets the fourth output to one of the second, fifth, and sixth outputs based on the first, second, third, and sixth outputs.

9. The system of claim 1 wherein:
    the first processor module transmits a first state signal to the second processor module, the first state signal indicating one of the N test states;
    the second processor module transmits a second state signal to the first and third processor modules, the second state signal indicating one of the N test states;
    the third processor module transmits a third state signal to the second processor module, the third state signal indicating one of the N test states; and
    the first, second, and third processor modules selectively enter one of the N test states based on the first, second, and third state signals.

10. The system of claim 9 wherein:
    the first and third processor modules enter a next one of the N test states when the second state signal is the same as the first and third state signals, respectively;
    the second processor module enters the next one of the N test states when the first and third signals indicate the next one of the N test states; and
    the first, second, and third processor modules execute the next one of the N test states when the first, second, and third signals indicate the next one of the N test states.

11. A method comprising:
    selectively executing a test having N test states using first, second, and third processor modules while an ignition system of a vehicle is off,
    wherein N is an integer greater than one and the N test states each include:
        setting a first output to a first predetermined value for one of the N test states using the first processor module;
        setting a second output to a second predetermined value for the one of the N test states using the second processor module;
        setting a third output to a third predetermined value for the one of the N test states using the third processor module;
        a predetermined expectation for the one of the N test states; and
        indicating a fault when a fourth output is different than the predetermined expectation using at least one of the first, second, and third processor modules; and
    setting the fourth output based on the first, second, and third outputs using a control module.

12. The method of claim 11 further comprising:
    generating a fifth output using the first processor module; and
    setting the fourth output to one of the second and fifth outputs based on the first, second, and third outputs using the control module.

13. The method of claim 12 further comprising driving an actuator of the vehicle based on the fourth output.

14. The method of claim 12 further comprising driving an electric motor of the vehicle based on the fourth output.

15. The method of claim 12 further comprising:
    applying power to an electric motor of the vehicle based on the fourth output; and
    selectively setting the fourth output to the fifth output when the ignition system of the vehicle is on using the control module.

16. The method of claim 15 further comprising setting the fourth output to the second output when the ignition system of the vehicle is on and a fault has been indicated using the control module.

17. The method of claim 15 further comprising, when the ignition system of the vehicle is on, generating the fifth output using the first processor module based on a torque request generated by the second processor module for the electric motor.

18. The method of claim 11 further comprising:
    generating a fifth output using the first processor module;
    generating a sixth output using the second processor module; and setting the fourth output to one of the second, fifth, and sixth outputs based on the first, second, third, and sixth outputs using the control module.

19. The method of claim 11 further comprising:

transmitting a first state signal to the second processor module using the first processor module, the first state signal indicating one of the N test states;

transmitting a second state signal to the first and third processor modules using the second processor module, the second state signal indicating one of the N test states;

transmitting a third state signal to the second processor module using the third processor module, the third state signal indicating one of the N test states; and selectively entering one of the N test states using the first, second, and third processor modules based on the first, second, and third state signals.

20. The method of claim 19 further comprising:

entering a next one of the N test states using the first and third processor modules when the second state signal is the same as the first and third state signals, respectively;

entering the next one of the N test states using the second processor module when the first and third signals indicate the next one of the N test states; and executing the next one of the N test states using the first, second, and third processor modules when the first, second, and third signals indicate the next one of the N test states.

* * * * *

UNITED STATES PATENT AND TRADEMARK OFFICE
CERTIFICATE OF CORRECTION

PATENT NO. : 9,122,662 B2  
APPLICATION NO. : 13/150646  
DATED : September 1, 2015  
INVENTOR(S) : James Mason Faucett et al.

Page 1 of 1

It is certified that error appears in the above-identified patent and that said Letters Patent is hereby corrected as shown below:

Title Page, Item [73] Assignee, insert the following:  
--GM Global Technology Operations LLC, Detroit, MI (US)--

Signed and Sealed this  
Tenth Day of May, 2016

Michelle K. Lee  
*Director of the United States Patent and Trademark Office*